(12) United States Patent
Weinman

(10) Patent No.: US 7,719,997 B2
(45) Date of Patent: May 18, 2010

(54) SYSTEM AND METHOD FOR GLOBAL TRAFFIC OPTIMIZATION IN A NETWORK

(75) Inventor: Joseph B. Weinman, Bedminster, NJ (US)

(73) Assignee: AT&T Corp, New York, NY (US)

( * ) Notice: Subject to any disclaimer, the term of this patent is extended or adjusted under 35 U.S.C. 154(b) by 603 days.

(21) Appl. No.: 11/617,309

(22) Filed: Dec. 28, 2006

(65) Prior Publication Data

US 2008/0159159 A1    Jul. 3, 2008

(51) Int. Cl.
*H04J 1/16* (2006.01)
(52) U.S. Cl. ........................ 370/252; 370/401
(58) Field of Classification Search ........................ None
See application file for complete search history.

(56) References Cited

U.S. PATENT DOCUMENTS 6,934,745 B2 *  8/2005  Krautkremer ................ 709/223
7,120,666 B2 * 10/2006  McCanne et al. ............ 709/203
7,433,304 B1 * 10/2008  Galloway et al. ............ 370/229

* cited by examiner

*Primary Examiner*—Frank Duong

(57) ABSTRACT

The present invention provides a system and method for providing global traffic optimization for a mix of applications running at multiple locations connected by a WAN. Various techniques are provided via WAN accelerator, edge shapers, and WAN bandwidth, route, QoS, and packet control to maximize application performance while minimizing cost, in accordance with customer policy.

15 Claims, 2 Drawing Sheets

System 100

System 100

SYSTEM AND METHOD FOR GLOBAL TRAFFIC OPTIMIZATION IN A NETWORK

FIELD OF THE INVENTION

The present invention generally relates to the field of communication. More specifically, the present invention relates to a telecommunication network for providing global traffic optimization.

BACKGROUND OF THE INVENTION

Telecommunications networks today are becoming more flexible and agile. For example, technologies such as reconfigurable optical add drop multiplexers and optical cross-connects enable 2.5, 10 Gigabit, and 40 Gigabit per second dense wave division multiplexed service channels to be switched virtually instantaneously from one pair of endpoints to a different endpoint under management software control. Technologies such as the Virtual Concatenation and Link Capacity Adjustment enable Synchronous Optical Network (SONET) bandwidth layer channels to be incremented or decremented by relatively fine grained STS-1 increments in services such as Optical Mesh Service, available from AT&T, Inc., of San Antonio, Tex. Multi-protocol Label Switching (MPLS) enables specification of specific routes through Virtual Private Network (VPN) Routing and Forwarding (VRF) tables, and alternate specific routes through MPLS Fast Reroute capability. MPLS also offers Quality of Service control, where, briefly, different packets traversing an MPLS network are given higher or lower priority for transport, and therefore experience different average latency in transmission. Also, technologies such as the Intelligent Routing Service Control Point (IRSCP), also available from AT&T, provide very fine grained route control and packet control at the IP layer. For example, a specific flow, comprising a given source IP address, destination IP address, and port number, may be sent to the destination along a specific route, and/or specific packets in the flow may be dropped, quarantined, or forwarded according to that header information.

In summary, a variety of technologies built into current and evolving telecommunications network equipment, or provided by telecommunications service providers, enable much greater flexibility and control than traditionally has been the case in what may be generally referred to as route control, bandwidth control, packet control, and quality of service (QoS) control. Route control is the ability to specify a sequence of nodes or hops for transported traffic to take. Bandwidth control is the ability to increment or decrement the capacity of a network link to carry traffic. QoS control is the ability to specify priority treatment of packets. Packet control is the ability to specify differential treatment of packets based on characteristics of the packet.

Separately, Wide Area Network (WAN) acceleration or application acceleration appliances are coming on the market. These include the Wide Area Acceleration System (WAAS), from Cisco systems of San Jose, Calif., as exemplary of a class of appliances that attempt to enhance performance of distributed applications used across a wide area network through a variety of techniques. One such technique is to cache recently accessed content at the edge, so that it may be accessed again locally without resorting to the Wide Area Network usage. Similar techniques include predictive caching and also protocol spoofing, that is, reducing the "chattiness" of protocols used by common applications such as Excel and Word from Microsoft Corporation of Redmond, Wash., by "fabricating" local responses rather than require a large number of synchronous responses that need to occur via transactions carried (slowly, relative to a Large Area Network (LAN)) over a Wide Area Network.

Finally, a group of technologies such as are available from Packeteer and Ipanema conduct what may be referred to as edge shaping, where a pair of appliances at a source and destination location may be used, in combination with a policy control layer, to prioritize traffic from one application over that arising from another. Such shaping can include dropping packets from the lower application.

As discussed above, various approaches, such as, WAN flexibility through route, bandwidth, packet, and QoS control, WAN acceleration through edge caching, edge shaping etc., are available to fulfill the application performance requirements. When faced with a variety of potential approaches, one is faced with an issue of what is the best strategy for a given application mix, that is, rather than a single monolithic application, a mix of applications such as voice over data, e.g., Voice over IP, video, application data, file transfer, storage applications such as mirroring and replication, etc. For example, if the transaction rate increases, one is faced with a point in question as to what is the better strategy, whether the overall system should increase bandwidth, or should it use shaping to reduce the offered load to the network of that application.

Thus, there is an extreme need to provide a globally optimum solution that leverages available approaches to best meet application performance requirements.

SUMMARY OF THE INVENTION

The present invention provides a method and a system for optimizing global data traffic in a network environment.

The system comprises a plurality of applications connected by a telecommunication network (WAN), wherein the applications residing at a plurality of environments and said WAN being capable of managing one or more control groups. The system also comprises at least one edge processor coupled to the environment for conducting one or more functions to reduce load of the global data traffic to fulfill performance objectives of the application and at least one shaper coupled to the edge processor to prioritize the global data traffic at ingress points to the network to fulfill the performance objectives of the application. The system further comprises a network control coupled to the WAN to activate and direct the control groups of the WAN The method comprises the following steps:
 (a) receiving instructions to determine performance objectives of at least one application;
 (b) determining whether performance objectives of said at least one application are being met;
 (c) edge processing to reduce the load of the data traffic if the performance objectives of said at least one application are not being met;
 (d) repeating step (b);
 (e) increasing available bandwidth on existing routes of the data traffic if the performance objectives of said at least one application are not being met;
 (f) repeating step (b);
 (g) rerouting data traffic along alternate routes if there is no additional bandwidth available on said existing routes and if the performance objectives of said at least one application are not being met;

(h) repeating step (b);
(i) edge shaping to prioritize data traffic at ingress points to the network if there is no bandwidth available on both said existing and said alternate routes and if the performance objectives of said at least one application are not being met;
(j) repeating step (b);
(k) using QoS control and packet control to handle packet data traffic if the performance objectives of said at least one application are not being met;
(l) repeating step (b);
(m) generating an alert signal if the performance objectives of said at least one application are not being met.

DETAILED DESCRIPTION OF THE INVENTION

Figure 1:
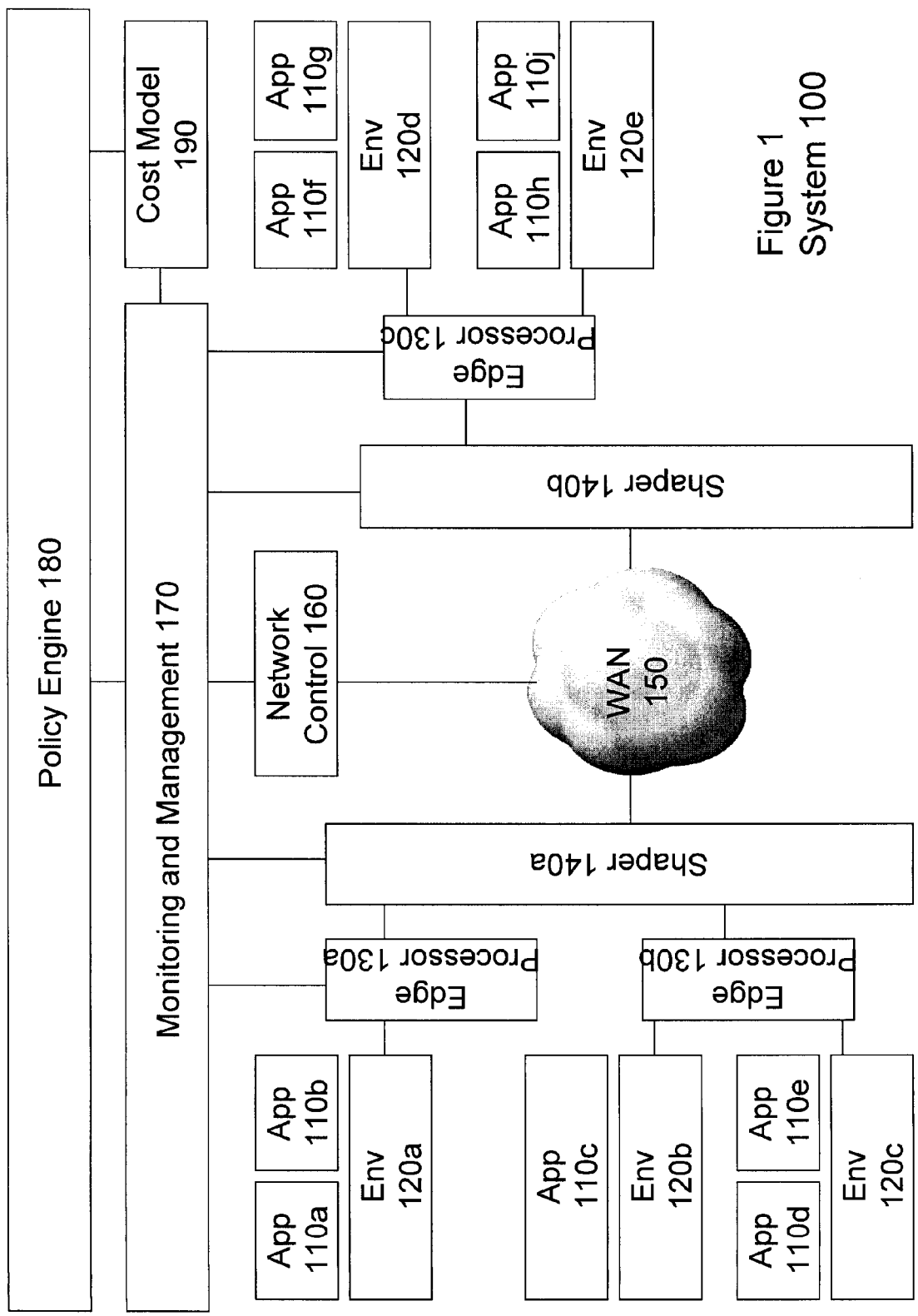
FIG. 1 is a schematic block diagram of an exemplary system for global traffic optimization according to an embodiment of the present invention.

Referring to FIG. 1, there is shown a schematic block diagram of an exemplary system 100 for global traffic optimization in accordance with one embodiment of the present invention. Disclosed are a set of applications 110$x$, herein shown as applications 110$a$ through 110$j$, residing on a set of environments 120$x$, shown herein as environments 120$a$ through 120$e$, Although, twelve applications, i.e. 110$a$ to 110$j$ and five environments, i.e. 120$a$ through 120$e$ are disclosed herein, note that any number of applications and environments may be provided in the system 100.

An application 110$i$ residing on an environment 120$i$ may preferably be e.g., a software application such as a desktop word processor, graphics, spreadsheet, Customer Relationship Management (CRM) application, or the like residing on an environment 120$i$ such as a thin client, a thick client running a browser, a scale out server, a "mainframe", or the like. On the other hand, the application 110$i$ also may preferably be a high definition video conferencing application, and environment 120$i$ may preferably be either a general purpose computer or a specially designed codec for video conferencing. Application 110$i$ may also desirably be a file system, content addressed storage application, network attached storage application, or the like, residing on an environment 120$i$ which is a storage subsystem.

In fact, application 110$i$, in general, may be viewed as a distinct entity with performance requirements and priorities, and the environment 120$i$ may be viewed as the hardware, firmware, and or software entity supporting the application 110$i$ that then communicates with network components. Also note that a given environment may support one application, or multiple applications 110, as shown in FIG. 1.

Environments 120$x$ are coupled to communicate with edge processors 130$x$, shown in FIG. 1 as edge processors 130$a$ through 130$c$, although the actual number may preferably be greater or lesser. Edge processors 130$x$ in turn are coupled to communicate with shaper 140$x$, shown here as shaper 140$a$ and shaper 140$b$, although the actual number may preferably be greater or lesser. An edge processor 130$x$ may comprise one or more modules, which either solely or together provide a means for conducting certain functions such as caching, protocol spoofing, predictive caching, TCP/IP offloading, and the like. Shaper 140$x$ provides edge QoS control, prioritizing various flows over other flows. For example, shaper 140$x$ may be directed to allocate 40% of the available bandwidth to a Voice over IP flow, 40% of the available bandwidth to a Video over IP flow, and the remaining bandwidth to file transfer. In the event that a file transfer application suddenly begins to request more bandwidth than it has been allocated, shaper 140$x$ can drop excess packets sent by the file transfer application to ensure that this bandwidth does not interfere with that allocated to the Voice and Video over IP flows. The Shaper 140$x$ in turn interact with each other across a Wide Area Network (WAN) 150. The WAN 150 is a flexible WAN, capable of one or more selected groups such as bandwidth control, QoS control, packet control, or route control. This controllability is activated and directed by a network control 160, coupled to the WAN 150. One of the functions of the network control 160, is for example, to direct WAN 150 to increase bandwidth available on a given route, or change a route from one sequence of locations to a different sequence of locations. For example, if network control 160 directs WAN 150 to increase available bandwidth on a given route, WAN 150 can preferably use technologies such as the Link Capacity Adjustment System on one or more SONET (Synchronous Optical Network) links together with Virtual Concatenation to increase that bandwidth. Other technologies such as the Intelligent Routing Service Control Point, available from AT&T, Inc., can be preferably used to specify specific paths. Other exemplary types of WAN control include packet control, where packets may be filtered at each router based on information such as source IP address, destination IP address, and/or port #, and consequently may be either forwarded, quarantined (held for potential future forwarding or dropping), or dropped based on one or more characteristics therein. Another type of WAN control, which may operate desirably with or without shaper 140, is QoS control, wherein packets belonging to different flows or with different markings are treated differently and or offered higher priority, as described above.

The system 100 also comprises a monitoring and management module 170, which is coupled to receive real time feeds from edge processors 130$x$, from shapers 140$x$, and from WAN 150 via the network control 160. In addition, monitoring and management module 170 is connected to interact with a policy engine 180 and a cost model 190 as illustrated in FIG. 1.

The flexibility of various components as described attempt to meet the application performance requirements of applications 110$x$. Policy engine 180 is used to make decisions in order to maintain customer application performance requirements and priorities, e.g., that application 110$a$ requires sub 200 millisecond response time, but application 110$b$ does not, since it is a file transfer application. Optionally and advantageously, cost model 190 may be used for decision support by policy engine 180. For example, costs of particular routes may be "too expensive" for lower priority applications but usable by high priority applications. Policy engine 180 may comprise an application requirements table such as shown below in Table 1 in exemplary fashion.

TABLE 1

| Application Name | Source IP, Destination IP, Port # | Target Class of Service | Performance Parameter | Threshold | |
|---|---|---|---|---|---|
| Video Conferencing | 1.2.3.4; 5.6.7.8; 80 | 2 | Minimum Bandwidth Allocation | >=15 | Mb/S |
| Customer Relationship Management | 2.3.4.5; 6.7.8.9; 1234 | 3 | Response Time | <200 | millisec |
| Database Backup | 3.4.5.6; 7.8.9.1; 1634 | 4 | Throughput | >1 | Mb/S |

If processing cycles and/or caching in edge processors 130x are paid for on a utility basis, cost model 190 may also be leveraged by policy engine 180 to determine, e.g., whether it is more cost effective to request additional bandwidth or whether it is more cost effective to preprocess traffic and cache content so as to reduce bandwidth requirements. For example, cost model 190 may specify that the first STS-1 (bandwidth increment) from Philadelphia to New York City is $1700 per month, the next STS-1 from Philadelphia to New York City is $1,000 per month, and the next such STS-1 is $700 per month. In fact, such costs may be described in terms of much smaller time increments, e.g., the first STS-1 is 3.9 cents per minute, the next is 2.3 cents per minute, and so forth. Such costs may not only relate to bandwidth, but also to processing. For example, utility pricing models for computing capacity are now becoming known in the art, one such model charges a variable amount for computing correlated with CPU utilization. Similarly, storage utility pricing is becoming available, wherein a variable cost for storage capacity used for some increment of time may exist, whereby less storage for a shorter duration costs less than more storage for a longer duration. Consequently, costs for shaping (processing costs), caching (processing and storage costs), compression (processing and possibly storage costs), quarantining (storage and possibly processing costs) and the like may also be incorporated into the cost model 190. Monitoring and management module 170 can leverage such information from the cost model 190 to optionally decide whether to preprocess and/or cache content, acquire more bandwidth, change routes, request more bandwidth within a given Quality of Service category, or the like, in conjunction with the real time monitoring of edge processors 130, shapers 140, and WAN 150. As an example of how such monitoring is used, consider a request for more bandwidth. There is no point in requesting additional bandwidth unless one is confident that the existing bandwidth is insufficient. Such a determination can only be made by monitoring existing bandwidth utilization, hence one of the key functions of monitoring and management module 170. Cost Model 190 may logically contain further components such as access, editing, creation, and the like (not shown), and may leverage a database shown in exemplary fashion in Table 2.

TABLE 2

| Parameter Type | Parameter Details | Cost Basis | Base Cost | Additional Cost (or Formula) |
|---|---|---|---|---|
| Bandwidth | Philadelphia to New York | STS-1/ minute | 3.9 cents | 2.3 cents for second STS-1, 1.6 cents for each additional |
| Compression Processing | Philadelphia/ New York Endpoint Pair | Megabyte | .08 cents | .08 cents |
| Traffic Shaping | Philadelphia/ New York Endpoint Pair | Megabyte | 0 cents | 0 cents |
| Bandwidth | Philadelphia to Los Angeles | STS-1/ minute | 5.7 cents | 5.7 cents |

In one embodiment of a system of the present invention, a mix of applications 110x generate network traffic across system 100 and specifically to edge processors 130x, shapers 140x, and WAN 150. System 100 in this first embodiment functions using a method as described with respect to FIG. 2 herein below.

Figure 2:
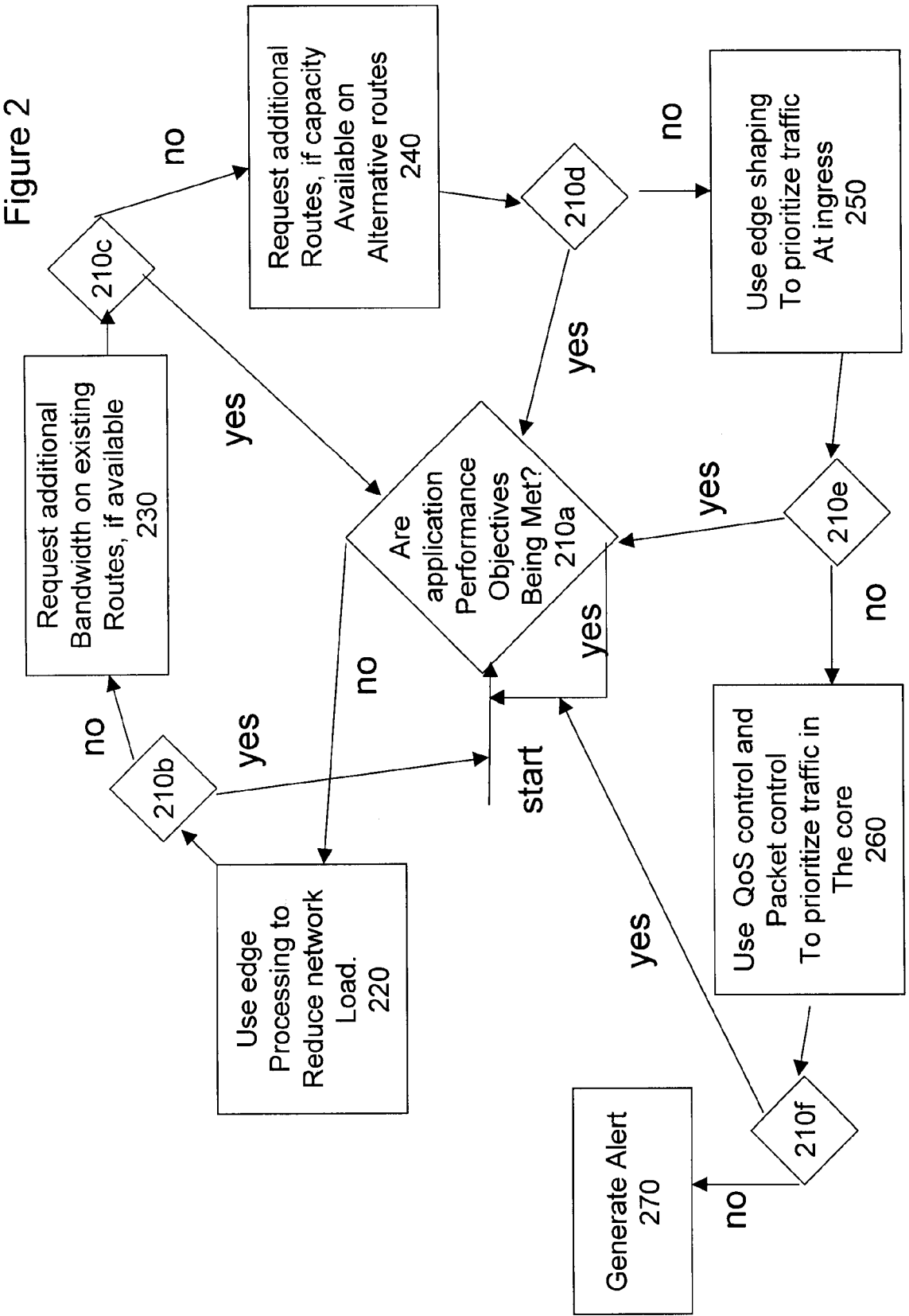
FIG. 2 is an exemplary flow diagram for global traffic optimization according to the embodiment of the present invention.

FIG. 2 illustrates a flow diagram 200 describing a method of the present invention, with numerals referenced in this specification corresponding to like numerals in FIG. 1. In normal circumstances, a relatively low level of data traffic relative to the capacity of system 100 does not "stress" system 100, i.e., there is more than sufficient capacity to meet the performance objectives of each application 110x. Now let's assume a scenario that transaction rates begin to increase and that there is insufficient capacity to fully meet the performance objectives of all applications 110x.

In step 210a, it is determined whether application performance objectives or requirements are being met. Referring to FIG. 1, such a step would be performed by policy engine 180 operating in conjunction with monitoring and management module 170. Application performance objectives would be specified via policy engine 180, and actual performance would be determined by monitoring and management module 170. If they are, step 210a is conducted again, looping until requirements are not met. If not, in step 220, edge processors 130x are utilized to reduce the data traffic load on system 100 through functions such as caching, predictive caching, and protocol spoofing, as described earlier. In one embodiment, these activities are conducted in an unconstrained basis, for example, each incoming data object may be locally cached. In an alternate embodiment, these activities are conducted in a cost-optimizing manner, based on data provided by cost model 190 Upon completion of step 220, then at step 210b, an analogue of step 210a, as are all steps 210x in this figure, again determines whether objectives are being met. If so, step 210a is conducted again. If not, then in step 230, in accordance with policy specified and maintained in the policy engine 180, the monitoring and management module 170 directs the network control 160 to increase the bandwidth available on existing routes to meet the increased demand. After step 230 is performed, in step 210c, it is again determined whether application performance requirements are being met. If so, then repeat step 210a. If not, and there is no additional bandwidth available on existing routes, then in step 240, the WAN 150 is directed by monitoring and management module 170 to reroute data traffic along alternate routes where there may be additional bandwidth available. After completion of step 240, in step 210d, it is determined whether application performance objectives are now being met. If so, then step 210a is again executed. If not, and bandwidth along all available/potential routes has been exhausted, in step 250, edge shaping is used to prioritize data traffic at ingress points to the network by leveraging shapers 140x. For example, Voice over IP may be given preference over bulk file transfer. Following step 250, in step 210e, it is once more determined whether application performance objectives are being met. If so, step 210a enters a loop again. If not, in step 260, QoS control and packet control are additionally used to prioritize data traffic through the core using packet prioritization and policing techniques such as leveraging a packet Class of Service tag. Such a step may be conducted by monitoring and management module 170, thus directing the WAN 150. In step 210f, it is again determined whether the application performance objectives are being met. If so, step 210a is again executed. If not, there are no further avenues of action available, since data traffic entering the network has been minimized in step 220, all bandwidth on available routes has been exploited in steps 230 and 240, and the remaining data traffic has been prioritized in steps 250 and 260. Consequently, in step 270 an alert is generated indicating that the system has failed to meet application performance objectives.

Note that the flow diagram as described above with respect to FIG. 2 is disclosed to execute steps in a specific sequence. However, these steps can be executed in any sequence including one or more steps can be preferably be done simultaneously or even one or more steps can be removed or any other possible means to meet the objectives of the applications.

Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. A system for optimizing global data traffic in a network environment, the system comprising:
    a plurality of applications connected by a telecommunication network (WAN), wherein said applications residing at a plurality of environments and said WAN is managing one or more control groups;
    at least one edge processor coupled to an environment for conducting one or more functions to reduce load of the global data traffic to fulfill performance objectives of an application;
    at least one shaper coupled to the edge processor to prioritize the global data traffic at ingress points to the network to fulfill the performance objectives of the application;
    a network control coupled to the WAN to activate and direct the control groups of the WAN;
    a monitoring and management control module for receiving real time data from the edge processor, shaper and the WAN via the network control; said module determining actual performance of the application performance objectives;
    a policy engine coupled to the module for specifying the performance objectives of the applications; and
    a cost model coupled to the module and the policy engine for providing pricing information on at least one of the data traffic, the edge processor, the shaper, the WAN, and the costs of processing or transporting the data traffic for each said application.

2. The system of claim 1 wherein said applications comprise at least one application selected from the group consisting of Voice over IP, Video over IP, desktop word processor, graphics, spreadsheet, customer relationship management, and high definition video conferencing.

3. The system of claim 1 wherein said environment comprises at least one environment selected from the group consisting of thin client, thick client running a browser, a scale out server, mainframe, and codec for video conferencing.

4. The system of claim 1 wherein said application comprise a storage application and said environment comprise a storage subsystem.

5. The system of claim 1 wherein said control group comprises at least one control group selected from the group consisting of bandwidth control, QoS control, packet control and route control.

6. The system of claim 1 wherein said functions comprise at least one function selected from the group consisting of caching, protocol spoofing, predictive caching, and TCP/IP offloading.

7. A method for optimizing global data traffic in a network environment, the method comprising:
    (a) receiving instructions to determine performance objectives of at least one application;
    (b) determining whether performance objectives of said at least one application are being met;
    (c) in an edge processor coupled to an environment in which the application is running, edge processing to reduce the load of the data traffic if the performance objectives of said at least one application are not being met;
    (d) determining whether performance objectives of said at least one application are being met;
    (e) increasing available bandwidth on existing routes of the data traffic if the performance objectives of said at least one application are not being met;
    (f) determining whether performance objectives of said at least one application are being met;
    (g) rerouting data traffic along alternate routes if there is no additional bandwidth available on said existing routes and if the performance objectives of said at least one application are not being met;
    (h) determining whether performance objectives of said at least one application are being met;
    (i) in a shaper coupled to the edge processor, edge shaping to prioritize data traffic at ingress points to the network if there is no bandwidth available on both said existing and said alternate routes and if the performance objectives of said at least one application are not being met;
    (j) determining whether performance objectives of said at least one application are being met;
    (k) using QoS control and packet control to handle packet data traffic if the performance objectives of said at least one application are not being met;
    (l) determining whether performance objectives of said at least one application are being met;
    (m) generating an alert signal if the performance objectives of said at least one application are not being met.

8. The method of claim 7 further comprising repeating step (b) if the performance objectives of said at least one application are not being met.

9. The method of claim 7 further comprising specifying the performance objectives of each said application.

10. The method of claim 7 further comprising providing pricing information on data traffic for each said application.

11. The method of claim 7 wherein said functions comprise at least one function selected from the group consisting of caching, predictive caching, protocol spoofing and TCP/IP offloading.

12. The method of claim 7 wherein said functions are conducted based on a pricing information of the for each said application.

13. The method of claim 7 wherein said functions are conducted without any constraints.

14. The method of claim 7 wherein said using the QoS control comprise prioritizing packets of the data traffic.

15. The method of claim 7 wherein said using the packet control comprise filtering packets of the data traffic based on the characteristics of the packet.

* * * * *